United States Patent [19]
Chambers et al.

[11] Patent Number: 6,108,738
[45] Date of Patent: *Aug. 22, 2000

[54] MULTI-MASTER PCI BUS SYSTEM WITHIN A SINGLE INTEGRATED CIRCUIT

[75] Inventors: Peter Chambers; David Gerard Spaniol, both of Phoenix; Ronald Lange, Glendale, all of Ariz.

[73] Assignee: VLSI Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/873,099

[22] Filed: Jun. 10, 1997

[51] Int. Cl.$^7$ .............................. G06F 13/00; G06F 13/20
[52] U.S. Cl. .......................... 710/113; 710/101; 710/107; 710/128; 710/241
[58] Field of Search ...................................... 395/287, 290, 395/309, 307; 710/107, 110, 129, 127, 113, 128, 101, 241

[56] References Cited

U.S. PATENT DOCUMENTS

| | | |
|---|---|---|
| 4,740,971 | 4/1988 | Tam et al. ................................. 371/21 |
| 5,241,631 | 8/1993 | Smith et al. .............................. 395/325 |
| 5,608,881 | 3/1997 | Masumura et al. ...................... 395/306 |
| 5,724,528 | 3/1998 | Kulik et al. .............................. 395/308 |
| 5,774,684 | 6/1998 | Haines et al. ............................ 395/309 |
| 5,790,814 | 8/1998 | Gan et al. ................................. 395/308 |
| 5,870,570 | 2/1999 | Chambers et al. ....................... 395/293 |

*Primary Examiner*—Ayaz R. Sheikh
*Assistant Examiner*—Tim Vo
*Attorney, Agent, or Firm*—Wagner Murabito & Hao LLP

[57] ABSTRACT

The present invention comprises a multiple bus master PCI (peripheral component interconnect) bus system within an integrated circuit. The system of the present includes an integrated circuit fabricated onto a single semiconductor die. An internal PCI bus is built into the integrated circuit. The internal PCI bus is adapted to transmit and convey data signals. A plurality of PCI agents are built into the integrated circuit. Each of the plurality of PCI agents are designed to perform a respective function and each of the plurality of PCI agents are coupled to the internal PCI bus to transmit and receive data. The internal PCI bus and the plurality of PCI agents are built into the integrated circuit on the single semiconductor die to create a high performance device.

12 Claims, 7 Drawing Sheets

MULTI-MASTER PCI BUS SYSTEM WITHIN A SINGLE INTEGRATED CIRCUIT

TECHNICAL FIELD

The present invention pertains to the field of computer system bus architectures. More particularly, the present invention relates to a fully integrated, single chip peripheral component interconnect (PCI) bus system having multiple bus masters.

BACKGROUND ART

A bus architecture of a computer system conveys much of the information and signals involved in the computer system's operation. One or more busses are used to connect a central processing unit (CPU) to a memory and to input/output elements so that data and control signals can be readily transmitted between these different components. When the computer system executes its programming, it is imperative that data and information flow as fast as possible in order to make the computer as responsive as possible to the user. In many hardware applications, such as graphics adapters, full motion video adapters, small computer systems interface (SCSI) host bus adapters, and the like, it is imperative that large block data transfers be accomplished expeditiously. These applications are just some examples of subsystems which benefit substantially from a very fast bus transfer rate.

In a computer system, the expansion bus is generally used as a method of adding functional components to the computer system. The functional components typically comprise individual circuit boards or cards. Each of the "expansion" cards includes a standardized connector for coupling to a matching connector on the expansion bus. The functional components are coupled to the expansion bus to communicate and exchange information. Thus, by adding expansion cards, the capabilities and the total functionality of the computer system is increased.

Traditionally, a separate and distinct function added to a computer system was implemented by a dedicated bus-based design embodied in a single expansion card. The expansion card containing the device (e.g., an audio device) was utilized by physically connecting the expansion card into one of a limited number of dedicated "slots" on the expansion bus. Additional functionality was added by simply installing additional expansion cards, with each expansion card embodying a distinct and separate function, thus, "expanding" the functionality and capabilities of the computer system. Soon, expansion bus architectures were specifically designed to provide for efficient expansion. The peripheral component interconnect (PCI) bus constitutes just such a expansion bus architecture, and has become an industry standardized, widely known, and widely used, expansion bus architecture.

Figure 1:
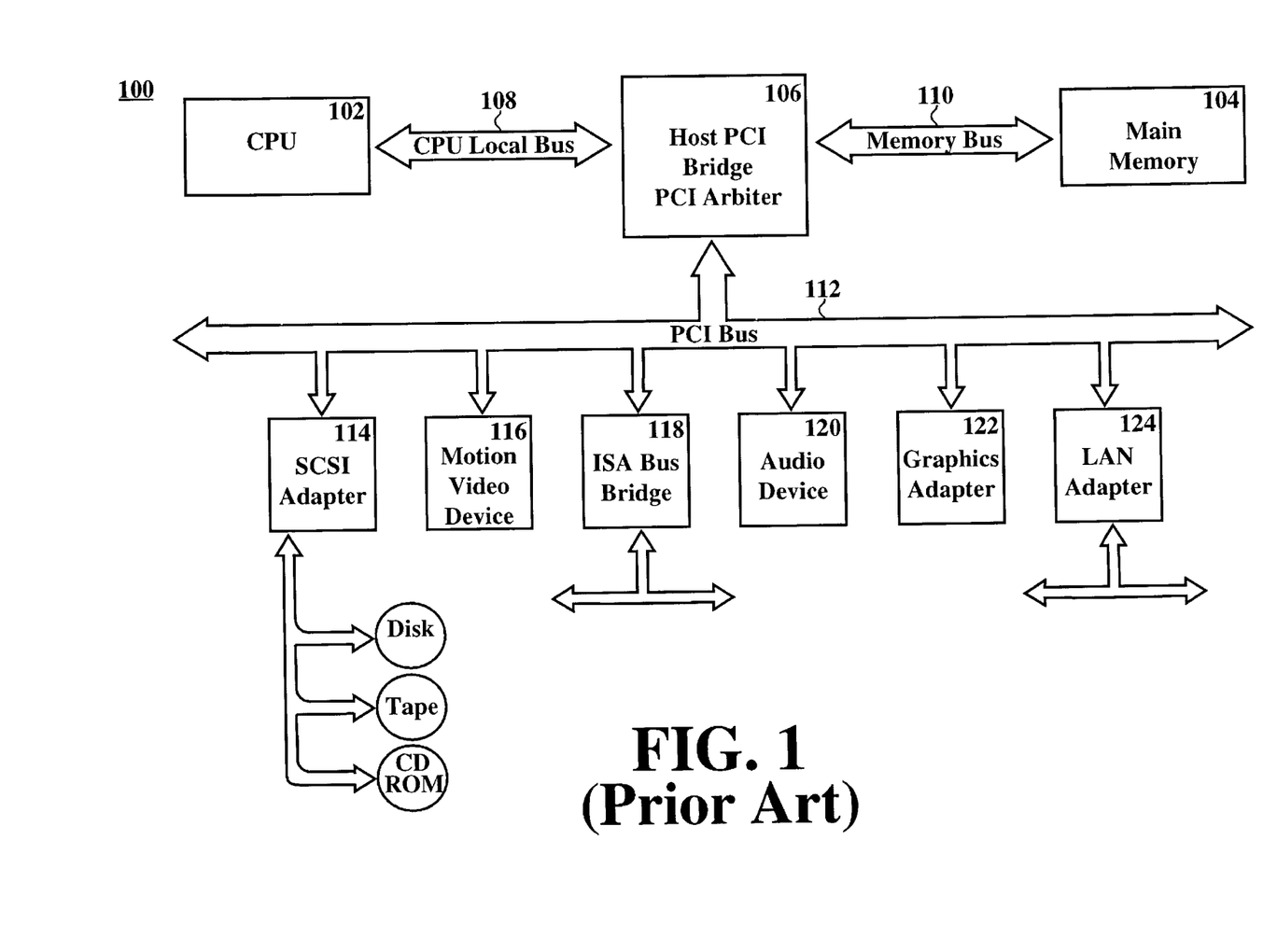
FIG. 1 shows a typical PCI bus architecture of the prior art.

Prior Art FIG. 1 shows a typical PCI bus architecture 100. PCI bus architecture 100 is comprised of a CPU 102 and a main memory 104, coupled to a host PCI bridge containing arbiter 106 (hereafter arbiter 106) through a CPU local bus 108 and memory bus 110, respectively. A PCI bus 112 is coupled to each of PCI agents 114, 116, 118, 120, 122, 124 respectively, and is additionally coupled to arbiter 106.

Referring still to Prior Art FIG. 1, each of PCI agents 114, 116, 118, 120, 122, 124 (hereafter, PCI agents 114–124) residing on PCI bus 112 use PCI bus 112 to transmit and receive data. PCI bus 112 is comprised of functional signal lines, e.g., interface control lines, address/data lines, error signal lines, and the like. Each of PCI agents 114–124 are coupled to the functional signal lines comprising PCI bus 112. When one of PCI agents 114–124 requires the use of PCI bus 112 to transmit data, it requests PCI bus ownership from arbiter 106. Each of PCI agents 114–124 may independently request PCI bus ownership. Thus, at any given time, several of PCI agents 114–124 may be requesting PCI bus ownership simultaneously. Where there are simultaneous requests for PCI bus ownership, arbiter 106 arbitrates between requesting PCI agents to determine which requesting PCI agent is granted PCI bus ownership. When one of PCI agents 114–124 is granted PCI bus ownership, it initiates a transaction (e.g., data transfer) with a "target device" or destination device (e.g., main memory 104).

Figure 2:
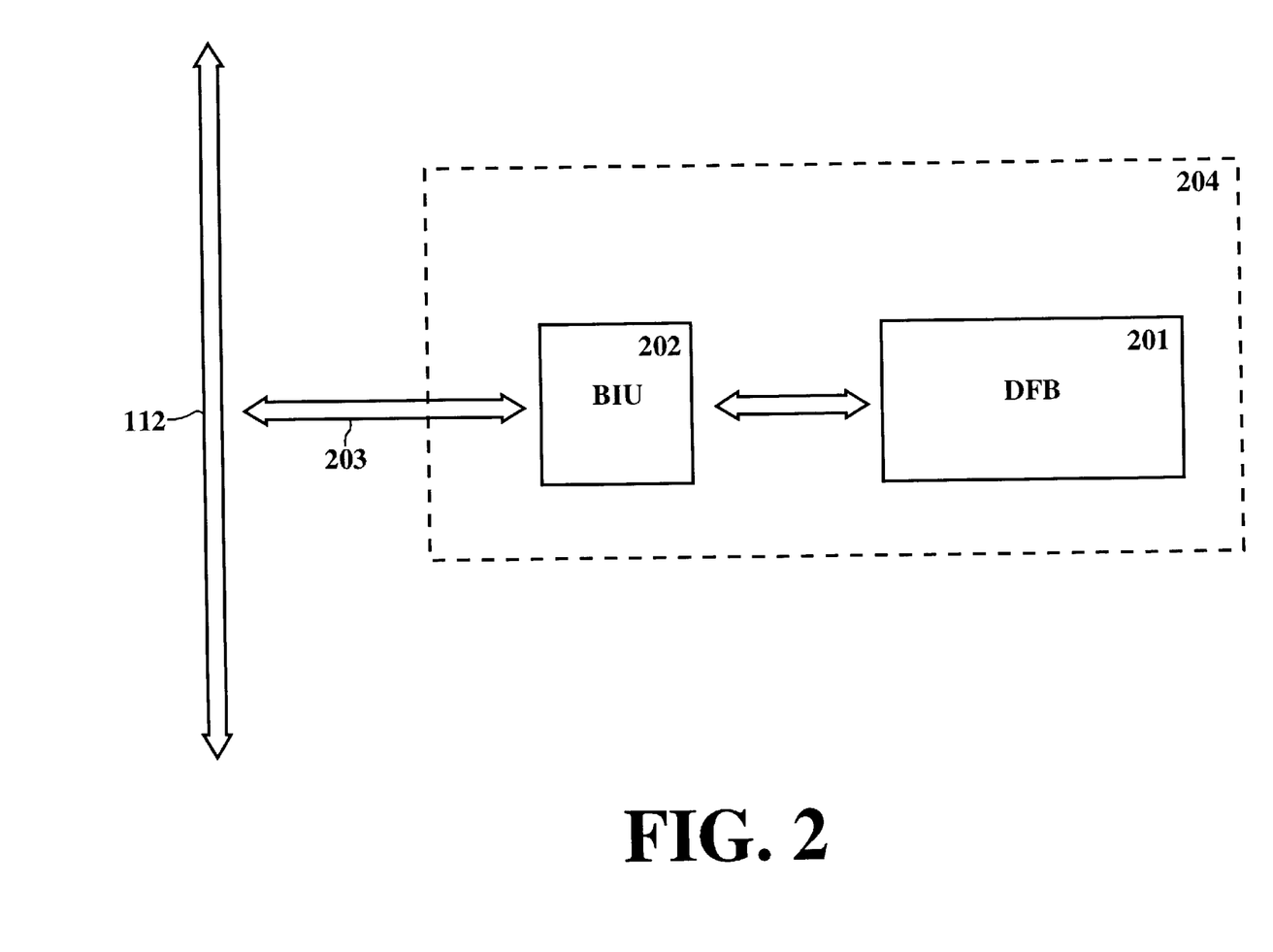
FIG. 2 shows an exemplary prior art PCI agent of the PCI bus architecture of FIG. 1.

Prior art FIG. 2 shows an exemplary PCI agent 200 of PCI bus architecture 100. PCI agent 200 includes a device functional block 201 coupled to a bus interface unit 202. The bus interface unit is, in turn, coupled via connector 203 to the PCI bus 112. The bus interface unit (BIU) 202 manages the signals and protocols which comprises the PCI specification and describe how PCI agents use a PCI bus. The device functional block (DFB) 201 actualizes the function or functions PCI agent 200 is designed to accomplish. DFB 201 includes the memory components, amplifiers, output drivers, and the like, which are required to implement the designed function. DFB 201 relies upon the BIU 202 to access PCI bus 112. The connector 203 couples the BIU 202 to the PCI bus 112. In so doing, the connector 203, and thus PCI agent 200, occupy one of the number of PCI slots of PCI bus 112.

Computer system users, however, soon discovered the PCI bus can usually support only a limited number of PCI agents. Once the limited number of PCI bus slots are occupied, it becomes expensive to add new PCI agents. If more PCI agents are desired, a hierarchical bridge to a subordinate PCI bus, which will accommodate its own set of PCI agents, is typically incorporated. The disadvantages of this solution include the added expense of the chipset implementing the PCI-to-PCI bridge function and the bus transfer latencies added to the PCI agents on the subordinate bus. Thus, many manufacturers have turned to systems and methods for sharing a single one of the limited number of PCI bus slots among multiple pre-existing PCI agents. Such systems and methods allow a previously designed, previously tested and debugged, and well known PCI agent, to be combined with other similar agents into a single multi-agent device.

Figure 3:
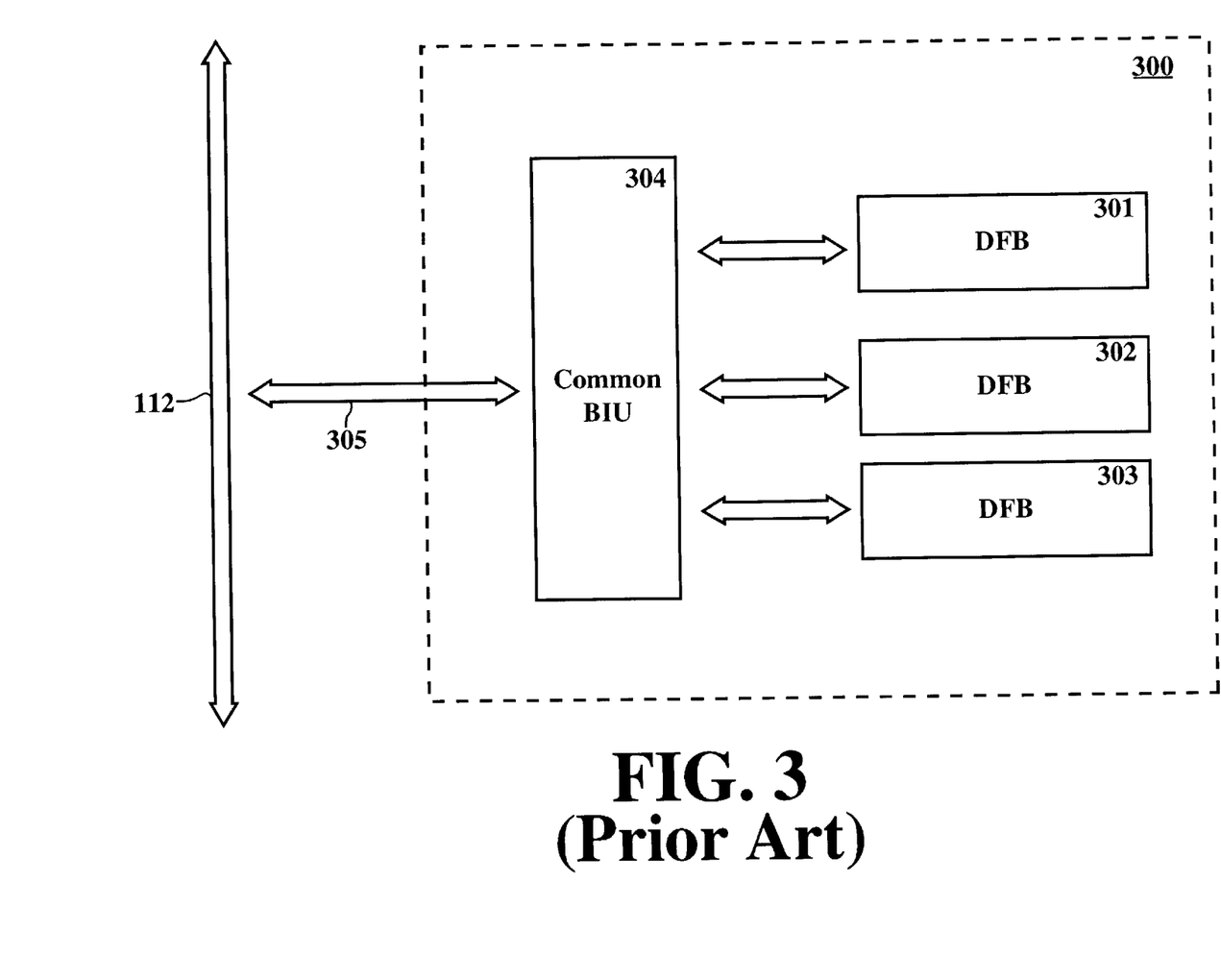
FIG. 3 shows a prior art multiple PCI agent device.

Prior art FIG. 3 shows one prior art multi-agent device 300 sharing a single PCI slot among multiple preexisting PCI agents. Device 300 includes a plurality of DFBs 301, 302, and 303 (hereafter DFBs 301–303). Each of DFBs 301–303 are coupled to a common BIU 304. The common BIU 304 is coupled to PCI bus 112 via bus connector 305, thus occupying one of the limited number of PCI bus slots of PCI bus 112.

Device 300 was manufactured by combining a number of DFBs from other typical pre-existing prior art PCI agents (e.g., DFB 201 from PCI agent 200) into a multi-agent device 300. The combining process involves severing a pre-existing DFB of the PCI agent (e.g., DFB 201) from its dedicated BIU (e.g., BIU 202) and including that DFB with a plurality of DFBs in a new device, sharing a common BIU. Thus, in device 300, the DFBs 301–303 each share the common BIU 304. The DFBs 301–303, in order to function, need to properly interface with the PCI bus 112 and comply with the PCI specification. The common BIU 304 performs the necessary interfacing with PCI bus 112 such that each of DFBs 301–303 are able to access the PCI bus 112. The multi-agent device 300 comprises a PCI bus expansion board (i.e., an integrated circuit board) designed to couple to PCI bus 112 via connector 305. Many manufacturers, however, have recently taken advantage of the rapid progress of integrated circuit technology and have integrated multi-agent device 300 into a single semiconductor die. In such a case, multi-agent device 300 functions in the same manner but, due to the inherent advantages of circuit integration, occupies much less space and consumes much less power.

The combining process described above, and in particular the severing of an existing DFB from its dedicated BIU, tends to be a straight forward process, so long as the circuitry comprising the DFB and the circuitry comprising the BIU are distinct and share a minimum number of common elements. In numerous cases, however, the severing process can be very difficult. In these difficult cases, the circuitry and logic functions comprising the DFB and BIU are intimately commingled and interspersed. Examples of such cases include PCI agents including structural designs (e.g., netlist or very high level design language, VHIDL) and designs translated from one high level design language to another (e.g., from VHDL to Verilog) which results in a set of very difficult to understand data files. In these difficult cases, redesigning the logic and the circuitry of the DFB from the preexisting PCI agent to sever the DFB from the BIU is a tedious, error prone, and very time consuming process. In addition, each severed DFB resulting from the process tends to be different from other such severed DFBs. Thus, the process has historically required the careful dissection of the BIU from the DFB in each PCI agent, followed by the creation of a customized common BIU which supports the plurality of functional blocks being combined.

As semiconductor fabrication technology has advanced, and for the reasons described above, it has become ever more imperative that a system be devised which provides for the fast easy migration of existing PCI based designs to single chip solutions. As designs become more complex and as their corresponding level of integration increases, the severance process becomes increasingly impractical. Simply proliferating the number of PCI expansion slots in computer systems is not the answer due to the added expense and additional overhead incurred.

Thus, what is required is a system which supports the direct connection of a plurality of PCI bus agents directly at the bus interface unit, thereby avoiding the whole severance process. Such a system should provide sufficient resources to ensure that the PCI bus protocols are complied with. What is further required is a system which effectively combines multiple pre-existing PCI agents into a single integrated circuit device. The required system should provide a well known, tested platform to which new designs can be created. The required system should provide a high performance, low overhead system for expanding the functionality and capabilities of a computer system. The present invention effectively satisfies the above requirements.

DISCLOSURE OF THE INVENTION

The present invention provides a system which supports the direct connection of a plurality of PCI bus agents directly at the bus interface unit, thereby avoiding the prior art severance process. By integrating a PCI bus system within a semiconductor die, the present invention ensures sufficient resources are provided to comply with PCI bus protocols. The system of the present invention effectively combines multiple pre-existing PCI agents into a single integrated circuit device. In addition, the present invention provides a well known, tested platform to which new PCI agent designs can be created. In so doing, the system of the present invention provides a high performance, low overhead system for expanding the functionality and capabilities of a computer system.

In one embodiment, the present invention comprises a multiple bus master PCI (peripheral component interconnect) bus system within an integrated circuit. The system of the present invention includes an integrated circuit fabricated onto a single semiconductor die. An internal PCI bus is built into the integrated circuit. The internal PCI bus is adapted to transmit and convey data signals in a manner compliant with the PCI bus specification. In this manner, the present invention provides a known, tested, and reliable platform to which new designs can be created.

A plurality of PCI agents are built into the integrated circuit. Each of the plurality of PCI agents are designed to perform a respective function and each of the plurality of PCI agents are coupled to the internal PCI bus to transmit and receive data. The PCI agents are coupled to the internal bus and interact with the internal PCI bus as if they were coupled to an ordinary prior art, external PCI bus. This allows the designs of the PCI agents to be easily integrated into the system of the present invention, thereby avoiding the prior art severance process and facilitating the fast, easy migration of existing PCI based designs to single chip solutions in accordance with the present invention. The PCI bus and the plurality of PCI agents are built into the integrated circuit and fabricated onto the single semiconductor die to create a single high performance device. By sharing the same semiconductor die, circuits of the internal PCI bus and the plurality of PCI agents realize a high performance, low overhead system.

In another embodiment of the present invention, integrated circuit further includes a PCI to PCI bridge. The PCI to PCI bridge is coupled to the internal PCI bus. The PCI to PCI bridge is adapted to couple to an external PCI bus and interface the signals of the external PCI bus with those of the internal PCI bus. In this manner, the system of the present invention provides an efficient method of interconnecting external PCI agents on the external PCI bus to the plurality of PCI agents on the internal PCI bus.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

Prior Art

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention provides a system which supports the direct connection of a plurality of PCI bus agents directly at the bus interface unit, thereby avoiding the prior art severance process. By integrating a PCI bus system within a semiconductor die, the present invention ensures sufficient resources are provided to comply with PCI bus protocols. The system of the present invention effectively combines multiple pre-existing PCI agents into a single integrated circuit device. In addition, the present invention provides a well known, tested platform to which new PCI agent designs can be created. In so doing, the system of the present invention provides a high performance, low overhead system for expanding the functionality and capabilities of a computer system. The present invention and its benefits are further described below.

Figure 4:
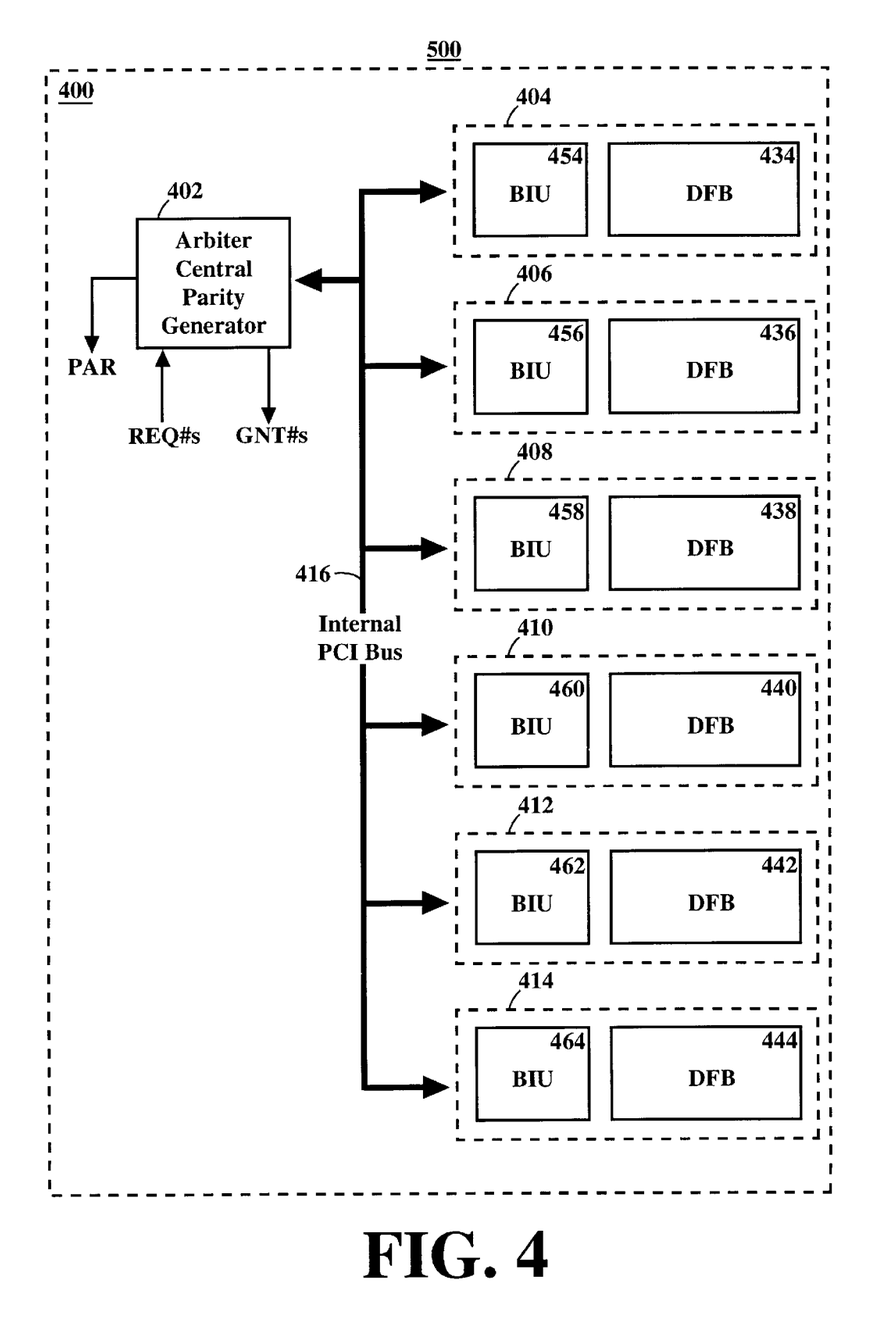
FIG. 4 shows a diagram of the components of a multiple PCI agent integrated circuit system in accordance with one embodiment of the present invention.

With reference now to FIG. 4, a diagram illustrating components of a multiple PCI agent integrated circuit system 500 in accordance with one embodiment of the present invention is shown. In the present embodiment, the multiple PCI agent integrated circuit system 500 (hereafter system 500) of the present invention comprises an integrated circuit 400 containing an arbiter/central parity generator 402 coupled to a plurality of PCI agents 10 404, 406, 408, 410, 412, and 414 (hereafter PCI agents 404–414) via an internal PCI bus 416. Arbiter/central parity generator 402 (hereafter arbiter 402) is coupled to the grant signal lines (GNT#s), the request signal lines (REQ#s), and the parity signal line (PAR) for PCI agents 404–414.

The PCI agents 404–414 include respective bus interface units 454, 456, 458, 460, 462, and 464 (hereafter bus interface units 454–464). The bus interface units 454–464 are in turn coupled to respective device functional blocks 434, 436, 438, 440, 442, and 444 (hereafter device functional blocks 434–444). Thus, each of PCI agents 404–414 includes a device functional block coupled to a bus interface unit. The bus interface units (BIU) 454–464 manage the signals and protocols which comprises the PCI specification and describe how PCI agents 404–414 use the internal PCI bus 416. The device functional blocks (DFB) 434–444 actualize the functions PCI agents 404–414 are designed to accomplish. DFBs 434–444 include the memory components, amplifiers, output drivers, and the like, required to implement the designed function. DFBs 434–444 rely upon the BIUs 454–464 to access the internal PCI bus 416. In addition, the specific manner in which the GNT#s, REQ#s, and PAR signal lines are routed to individual PCI agents 404–414 in system 500 follows well known PCI specification standards. As such, the specific routing of the GNT#s, REQ#s, and PAR signal lines is not shown in order to avoid unnecessarily obscuring aspects of the present system 500.

With reference still to FIG. 4, arbiter 402 performs two functions for internal PCI bus 416. One function is bus arbitration. Arbiter 402 arbitrates among the bus masters coupled to internal PCI bus 416 (e.g., those of PCI agents 404–414 which are bus master agents) for ownership of internal PCI bus 416. This arbitration is carried out in a manner compliant with the PCI specification, and can utilize any of a number of well known arbitration algorithms. It should be appreciated that bus arbitration is a ruined function for compliance with the PCI specification.

Another function performed by arbiter 402 is parity generation and checking. If PCI agents 404–414 include at least one PCI agent which supports centralized parity generation and checking and at least one PCI agent which does not, then the central parity generator included within 20 arbiter 402 can be used to provide the PAR signal on internal PCI bus 416. The PAR signal generates parity across AD[31:0] and C/BE#[3:0], as required by the PCI specification. It should be noted that those of PCI agents 404–414 which do generate parity will have their respective parity outputs disconnected. In the present embodiment, all parity generation is provided by the central parity generator (e.g., arbiter 402). It should be appreciated that central parity generation is optional. For example, in those embodiments where none of PCI agents 404–414 support parity generation, or where parity generation is not required for a particular use contemplated, the central parity generator is omitted. Also, if each of PCI agents 404–416 support parity generation, the central parity generator is omitted.

Referring still to FIG. 4, it should be appreciated that by integrating internal PCI bus 416 directly into integrated circuit 400 as a complete PCI bus system, the present invention avoids the problems and difficulties associated with the prior art process of combining multiple PCI agents into a single device. Each of PCI agents 404–414 retains its respective original one of BIUs 454–464. In so doing, the process of severing the circuitry comprising BIUs from the circuitry comprising DFBs is avoided. The multiple PCI agent integrated circuit system of the present invention eliminates the need to intricately and tediously separate commingled and interspersed BIU-DFB logic. Thus, the requirement for expensive and difficult redesigning of logic circuitry is also eliminated.

The fact that internal PCI bus 416 is a PCI specification compliant bus architecture leads to easy migration of existing PCI agent designs from stand alone configurations to fully integrated, high performance, high efficiency configurations. Using the multiple PCI agent integrated circuit system of the present invention, manufacturers can integrate existing PCI agent designs into a single comprehensive design with very little effort in comparison to the combining process of the prior art. Redesign is minimized because the system of the present invention allows the subsequent reuse of a very large percentage of an existing PCI agent design. Instead of coupling to a prior art, non-integrated PCI bus through a connector (e.g., the connector on an expansion card embodying the PCI agent), the design of the PCI agent is coupled to the design of the internal PCI bus 416 and is fabricated directly into integrated circuit 400. This allows the design data for the existing PCI agent to be used with few, if any, changes. The existing PCI agent will function in a normal fashion, as if coupled to a prior art, non-integrated PCI bus.

In addition, it should be appreciated that the existing PCI agent's design data (e.g., VHDL or Verilog design data) can be essentially "dragged and dropped" from a previous existing data base (defining the existing PCI agent design) into a data base in accordance with the present invention in a rapid and expedient fashion. The data base in accordance with the present invention, now including the "dragged and dropped" design data defining the existing PCI agent design, is subsequently manufactured, resulting in a device in accordance with the integrated circuit 400 of the present embodiment.

Thus, through the process described above, any of PCI agents 404–414 could have originated as a pre-existing PCI agent device. Additionally, any of PCI agents 404–414 can be a completely original design. It should be appreciated that from the perspective of PCI agents 404–414, the internal PCI bus 416 is indistinguishable from the external PCI bus 418, or any other PCI specification compliant bus. PCI agents 404–414 interact and interface with PCI bus 416 in tile same manner, regardless of whether the PCI agents 404–414 are integrated into the integrated circuit 400, or each reside on separate expansion cards. However, due to the fact that system 500 is completely integrated onto a single silicon die (e.g., integrated circuit 400), the system of the present invention realizes several important benefits.

A first benefit provided by system 500 results from the fact that the complete integration of internal PCI bus 416 and PCI agents 404–414 greatly reduces manufacturing costs. If system 500 were manufactured using prior art, non-integrated techniques, each of PCI agents 404–414 would be comprised of several integrated circuits, combined onto separate expansion cards. Such a system would be much more expensive to manufacture. Another benefit is the fact that a single chip solution (e.g., system 500) results in much lower communication overhead, in comparison to a prior art multiple chip, multiple expansion card system. Yet another benefit of the system of the present invention is the fact that by supporting the industry standard PCI specification, the present invention provides for fast, easy migration of existing PCI based designs to high performance, high efficiency single chip solutions. Additionally, by supporting the PCI specification, the present invention provides a known, reliable, tested platform to which new designs can be created.

Another benefit of the present invention is the fact that clock frequencies of internal PCI bus 416 can be much higher than those of a prior art system. This results in higher performance. For example, a standard prior art, non-integrated PCI bus system typically has a maximum burst transfer rate of 132 Mbytes/second, while a 50 MHz prior art PCI bus has a maximum burst transfer rate of 200 Mbytes/second. The 50 Mhz bus frequency is easily achievable with the internal PCI bus 416 of the present invention.

With reference still to FIG. 4, it should be appreciated that system 500 of the present invention can include certain modifications which stream line or simplify aspects of particular implementations. For example, several modifications can be made to internal PCI bus 416. The modifications allow system 500 to be optimized to a particular contemplated use, wherein the features deemed nonessential are omitted.

One feature of internal PCI bus 416 readily suited to modification is the operating frequency. As described above, internal PCI bus 416 is not constrained by the factors which limit the frequency of prior art non-integrated PCI busses. Internal PCI bus 416 may operate at any frequency that is reliable for the technology used to fabricate the device. Table 1 shows timing parameters of a 50 MHz implementation of the present invention. The following timing numbers are exemplary and are based on an internal PCI bus 416 frequency of 50 MHz (e.g., a period of 20 ns). There is considerable margin built into the table.

TABLE 1

Internal PCI Bus Timing Parameters (50 MHz)

| Parameter | 1 Time (ns) |
|---|---|
| Clock skew assumption (max) | 1 |
| Input setup time (min) | 5 |
| Clock-to-out delay time (max) | 6 |
| Data hold time | 0 |

Another feature of internal PCI bus 416 suited to modification is the PCI 16 clock latency timer. The PCI 16 clock latency timer is a standard feature described by the PCI specification. For internal PCI bus 416, it is not mandatory that the PCI 16 clock latency timer and companion delayed transaction logic be implemented. However, a master PCI agent still needs to be able to handle a retry from a target in order to help resolve deadlocks and to handle targets which do implement the latency timer.

Another feature of internal PCI bus 416 suited to modification is the lock function (e.g., the LOCK# signal). The lock signal LOCK# is a standard PCI signal described by the PCI specification. Internal PCI bus 416 need not support the lock function or the LOCK# signal.

Another feature suited to modification are special cycles. Special cycles are typically commands issued by an master PCI agent to broadcast a message to one or more targets PCI agents. In accordance with the PCI specification, PCI agents may optionally ignore special cycles. Hence, support for special cycles may be omitted.

Additionally, internal PCI bus 416 need not support the memory write/invalidate command, the read multiple command, the memory read (cache) line command, or the dual address cycle command. Where system 500 includes an optional PCI to PCI bridge (as described below), the bridge may alias the read multiple and memory read line to simple burst memory reads and the memory write/invalidate to a write command.

Other features suited to modification include the following: Fast back-to-back cycles are optionally supported. The PCI Status Register is optional. If it already exists in PCI agents that have software drivers which use status registers, then it should remain in. Internal PCI bus 416 does not require the use of parity, optionally eliminating parity generation and checking. If any of PCI agents 404–414 implement parity checking, then this may be supported by the use of the PCI agents which generate parity, or through the optional central parity generator, as described above. If required, the output of the optional central parity generator is fed to the PAR inputs of those PCI agents which require parity to be correct, according to the PCI specification.

In addition to the above optional modifications, there are several modifications to the standard PCI specification control signals. For example, the control signals FRAME#, IRDY#, TRDY#, DEVSEL#, LOCK#, PERR#, SERR#, INTA#, INTB#, INTC#, INTD#, CLOCKRUN#, REQ64#, ACK64#, and STOP# are changed from tristate in-out signals to separate input signals and separate output signals. The output signals will be combined through a logical OR to form the input signal. For example, the FRAME# signal at each of PCI agents 404–414 is now FRAME_OUT# and FRAME_IN#. FRAME_OUT# is the logical AND of the regular FRAME# output signal and its tristate control line. The signal to drive the IDSEL line input can be tied directly to a bit on the AD lines of internal PCI bus 416, similar to the usage in a prior art non-integrated PCI bus except that a resistor is not needed. The PERR# and SERR# signals are optional and may be ignored if not required by any of PCI agents 404–414. REQ64# and ACK64# are only used if required by any of PCI agents 404–414 which are 64 bit agents.

Figure 5:
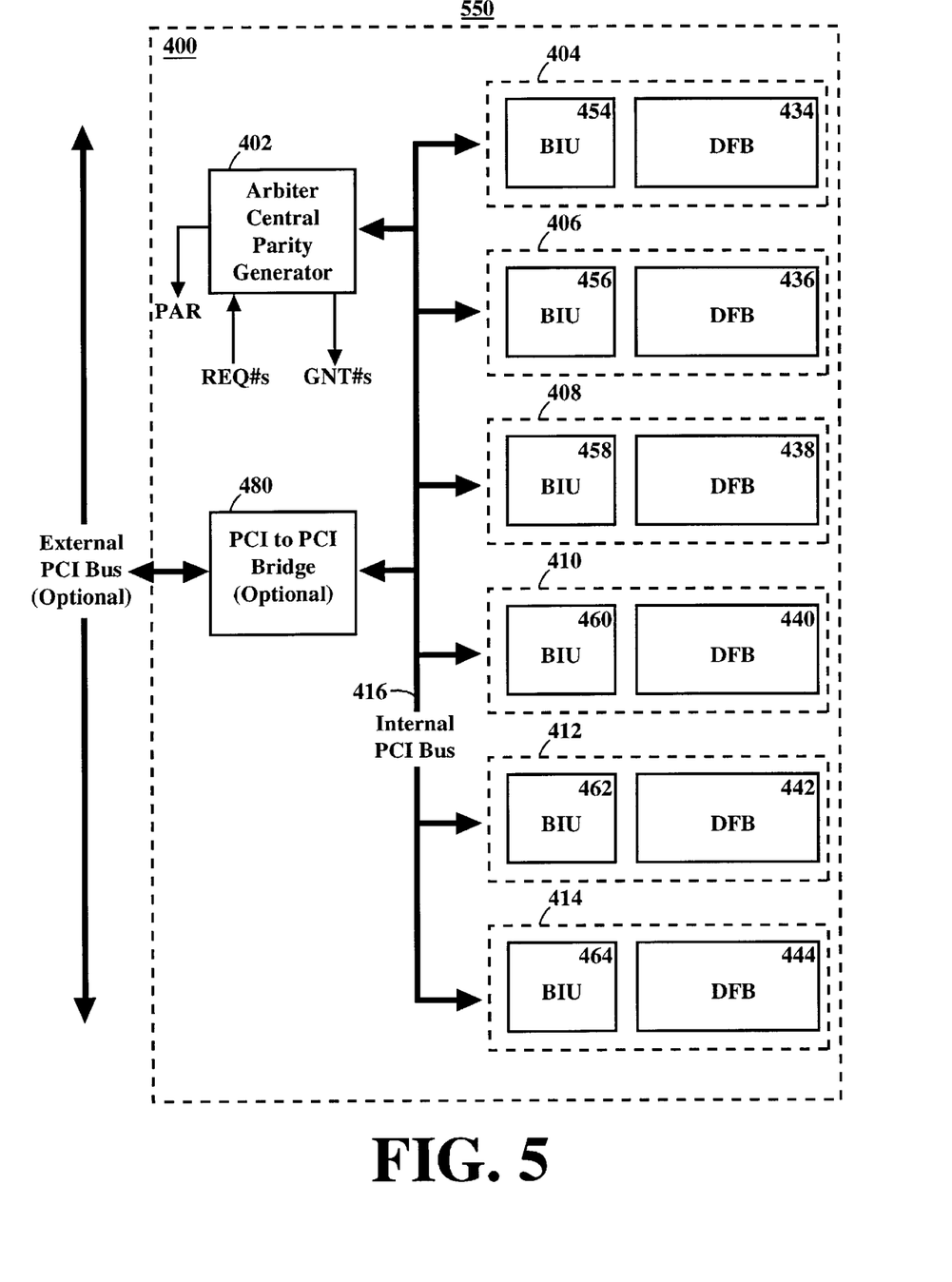
FIG. 5 shows a diagram of the components of a multiple PCI agent integrated circuit system in accordance with another embodiment of the present invention.

Referring now to FIG. 5, a diagram illustrating components of a multiple PCI agent integrated circuit system 550 in accordance with another embodiment of the present invention is shown. Multiple PCI agent integrated circuit system 550 (hereafter system 550) is similar to system 500 except that system 550 includes an optional PCI to PCI bridge 480 and an optional external PCI bus 490. PCI to PCI bridge 480 (hereafter bridge 480) functions by coupling internal PCI bus 416 to external PCI bus 490.

The PCI specification defines the functions and parameters of PCI to PCI bridges. In general, PCI to PCI bridges are used to couple two or more PCI busses such that PCI agents coupled to the PCI busses can communicate, regardless of which PCI bus they are couple to. Thus, bridge 480 allows any of PCI agents 404–416 to communicate with a PCI agent on external PCI bus 490. It should be noted that bridge 480 is only required where an external PCI bus (e.g., external PCI bus 490) is part of the system.

Bridge 480, in accordance with the present embodiment, may be either a full synchronizing bridge or a simple buffer based bridge. Where bridge 480 is a full synchronizing bridge, bridge 480 needs to ensure signals are properly interfaced between the internal PCI bus 416 and the external PCI bus 490, even when they operate at different clock frequencies. If the two PCI busses run at different frequencies, bridge 480 must be a "full" implementation. In such a case, for example, bridge 480 would include extensive synchronization logic, protocol conversion logic, and data buffering capabilities. Where bridge 480 is a buffer based bridge, however, bridge 480 may be a set of bi-directional and unidirectional buffers and some associated control logic. In this case, the two busses (e.g., internal PCI bus 416 and external PCI bus 490) need to run at the same clock frequency.

This may be appropriate for many applications.

Figure 6:
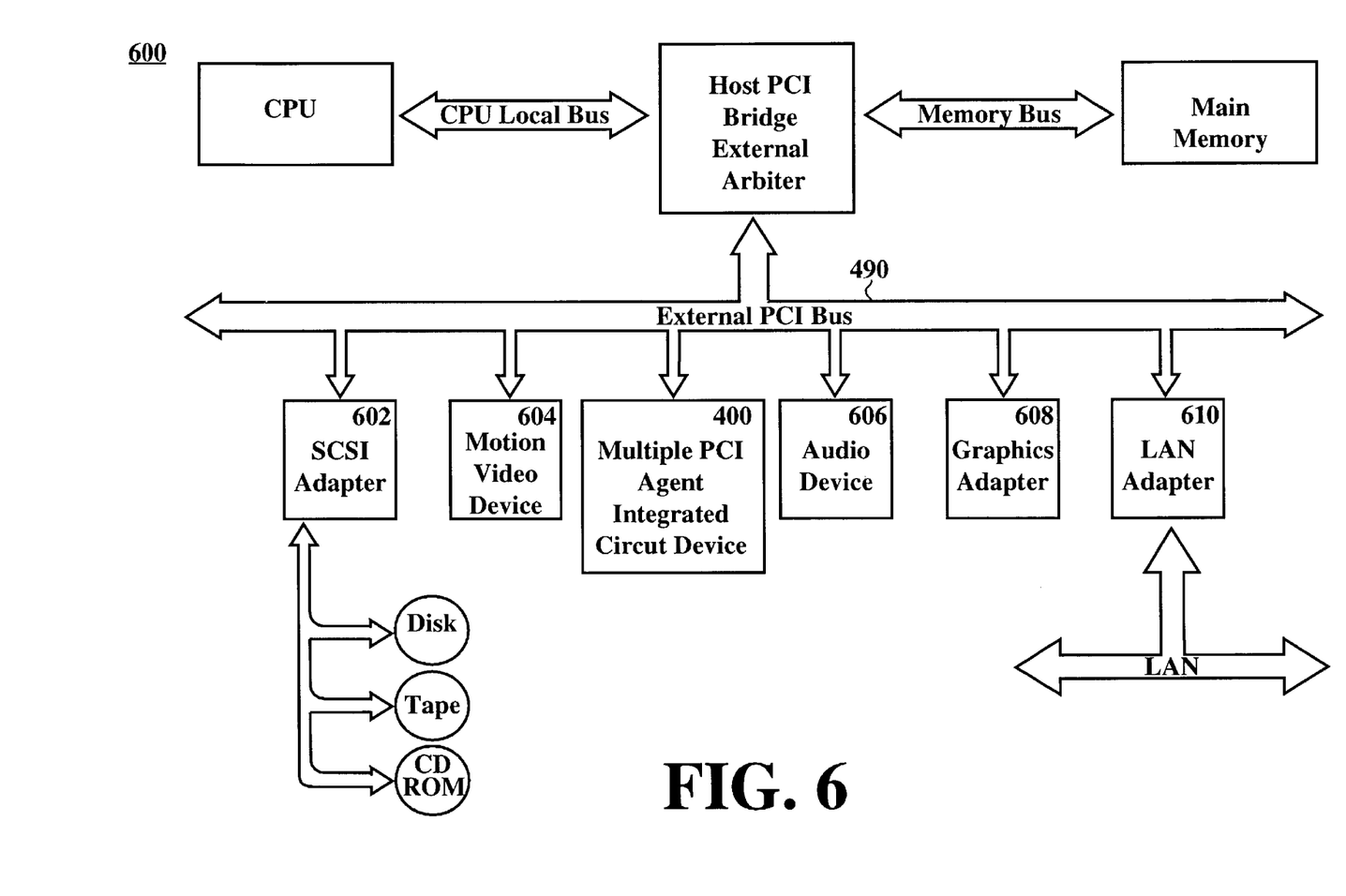
FIG. 6 shows a PCI bus architecture including a multiple PCI agent device in accordance with one embodiment of the present invention.

Referring now to FIG. 6, a PCI bus architecture 600 including the multiple PCI agent integrated circuit 400 in accordance with one embodiment of the present invention is shown. The multiple PCI agent integrated circuit 400 couples the external PCI bus 490 in the manner described above. PCI bus architecture 600 includes PCI agents 602, 604, 606, 608, and 610. PCI bus architecture 600 also includes the plurality of PCI agents 404–414 within the multiple PCI agent integrated circuit 400. Thus, in the present embodiment, the multiple PCI agent integrated circuit 400 effectively doubles the number of PCI agents available to PCI bus architecture 700. In addition, if bridge 480 of integrated circuit 400 is a full synchronizing bridge, PCI agents 404–414 can communicate across internal PCI bus 416 at much higher frequencies than those supported by external PCI bus 490.

Figure 7:
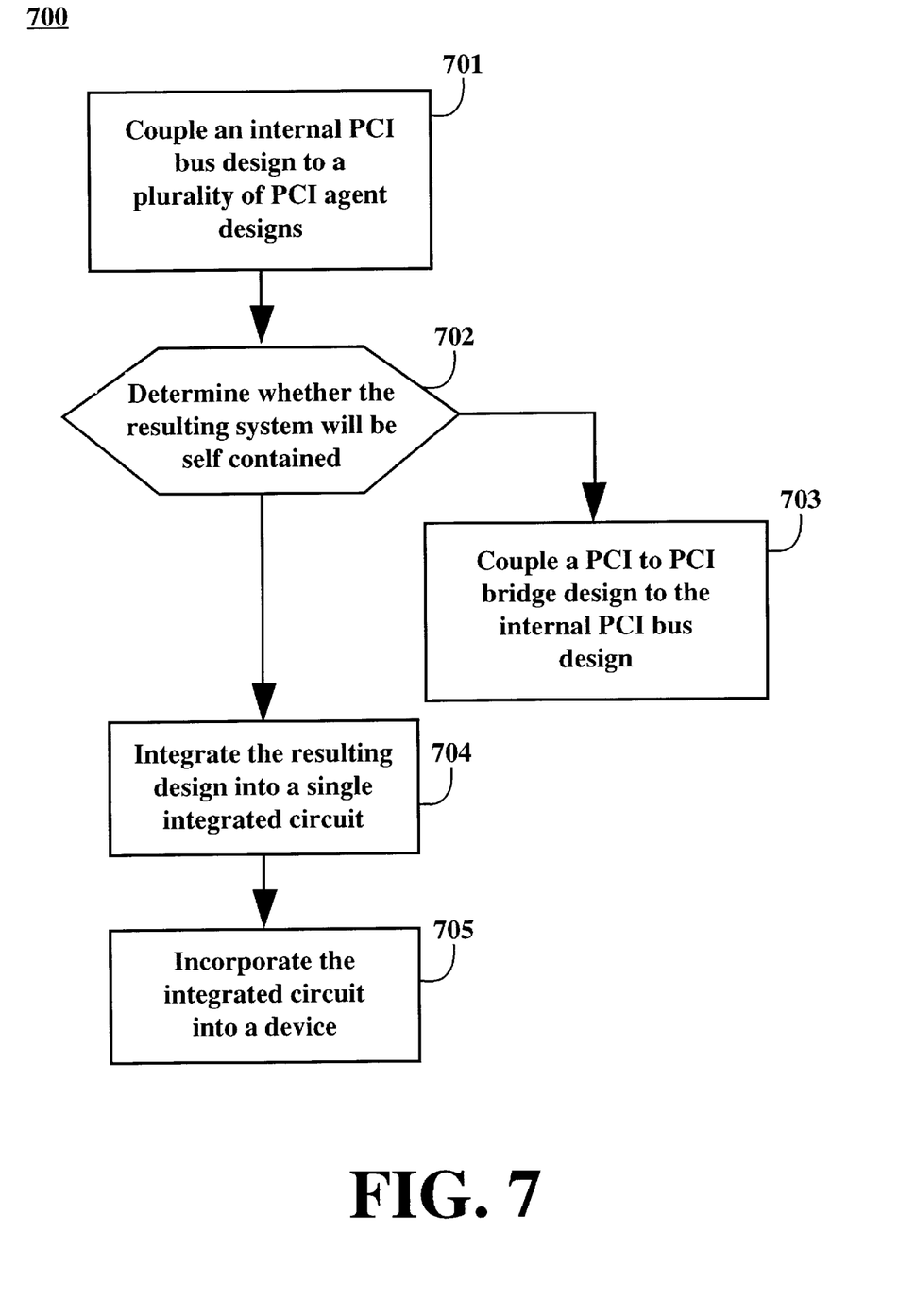
FIG. 7 shows a flow chart of the steps of a process in accordance with one embodiment of the present invention.

Referring now to FIG. 7, a flow chart of the steps of a process 700 in accordance with one embodiment of the present invention is shown. Process 700 comprises a process of fabricating a system in accordance with the present invention (e.g., system 500 or system 550).

Process 700 begins in step 701, where an internal PCI bus design (e.g., internal PCI bus 416) is coupled to a plurality of PCI agent designs e.g., PCI agents 404–414). As described above, the PCI agents can be either pre-existing designs or entirely new designs. The internal PCI bus design complies with the tolerances and requirements of the PCI specification. As such, the internal PCI bus provides a known, tested, and reliable platform to which existing designs can be coupled or new designs can be created.

In step 702, it is determined whether the device resulting from process 700 is to be a self contained system. If the device resulting from process 700 is to be a self contained system the device will include those components necessary to implement its desired function. In this case, process 700 proceeds to step 704. If the resulting device is to be coupled to an external PCI bus, process 700 proceeds to step 703.

In step 703, where the resulting device will not be self contained, a PCI to PCI bridge design is coupled to the internal PCI bus design. As described above, the PCI to PCI bridge (e.g., bridge 480) allows communication between the internal PCI bus and an external PCI bus (e.g., external PCI bus 490). By including the PCI to PCI bridge, the resulting device may be utilized within a host computer system having a PCI bus.

In step 704, the resulting design (e.g., the resulting design including the design of the internal PCI bus, the PCI agents, and the like) is integrated into a single integrated circuit (e.g., integrated circuit 400). All the components of the system of the present invention (e.g., system 500) are fabricated into a single semiconductor die. The integrated circuit includes PCI to PCI bridge, if required.

In step 705, the integrated circuit is incorporated into a device. This device (e.g., the resulting device) includes any necessary packaging required in order to properly carry out the device's intended function. Such packaging could include, for example, a plastic or ceramic case, a printed wiring board, or the like. Where the device is intended to couple to an external PCI bus, the necessary packaging includes a PCI bus connector.

Thus, the present invention provides a system which supports the direct connection of a plurality of PCI bus agents directly at the bus interface unit, thereby avoiding the prior art severance process. By integrating a PCI bus system within a semiconductor die, the present invention ensures sufficient resources are provided to comply with PCI bus protocols. The system of the present invention effectively combines multiple pre-existing PCI agents into a single integrated circuit device. In addition, the present invention provides a well known, tested platform to which new PCI agent designs can be created. In so doing, the system of the present invention provides a high performance, low overhead system for expanding the functionality and capabilities of a computer system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defiled by the Claims appended hereto and their equivalents.

What is claimed is:

1. A multiple bus master PCI (peripheral component interconnect) bus system within an integrated circuit, comprising:

an integrated circuit fabricated onto a semiconductor die;

an internal PCI bus built into said integrated circuit, said internal PCI bus adapted to transmit data signals thereon;

a plurality of PCI agents built into said integrated circuit, each of said plurality of PCI agents for performing a function, each of said plurality of PCI agents coupled to said internal PCI bus, said internal PCI bus and said plurality of PCI agents built into said integrated circuit on said semiconductor die to form a high performance device, wherein at least one of said plurality of PCI agents is a pre-existing PCI agent with respect to said high performance device; and a parity generator circuit built into said integrated circuit, said parity generator circuit adapted to respond to parity generation and checking signals from at least one of said plurality of PCI agents.

2. The multiple bus master PCI system of claim 1, further comprising:

an arbiter circuit built into said integrated circuit, said arbiter circuit adapted to arbitrate among said plurality of PCI agents for ownership of said internal PCI bus.

3. The multiple bus master PCI system of claim 1, further comprising:

a PCI to PCI bridge built into said integrated circuit, said PCI to PCI bridge adapted to interface said internal PCI bus with an external PCI bus such that said plurality of PCI agents can communicate with said external PCI bus.

4. The multiple bus master PCI system of claim 1, wherein said internal PCI bus is adapted to substantially comply with a PCI bus specification with respect to interfacing with said plurality of PCI agents.

5. The multiple bus master PCI system of claim 3, wherein said PCI to PCI bridge is adapted to synchronize signals on said internal PCI bus with said external PCI bus, wherein said internal PCI bus and said external PCI bus operate at different frequencies.

6. The multiple bus master PCI system of claim 3, wherein said PCI to PCI bridge is a buffer based bridge adapted to interface said internal PCI bus with said external PCI bus, wherein said internal PCI bus and said external PCI bus operate at the same frequency.

7. A fully integrated, single semiconductor die PCI (peripheral component interconnect) bus system, comprising:

an integrated circuit fabricated onto a semiconductor die;

an internal PCI bus built into said integrated circuit, said internal PCI bus adapted to transmit data signals thereon;

a plurality of PCI agents built into said integrated circuit, each of said plurality of PCI agents for performing a function, each of said plurality of PCI agents coupled to said internal PCI bus, said internal PCI bus and said plurality of PCI agents built into said integrated circuit on said semiconductor die to form a high performance device, wherein at least one of said plurality of PCI agents is a pre-existing PCI agent with respect to said high performance device;

an arbiter circuit built into said integrated circuit, said arbiter circuit adapted to arbitrate among said plurality of PCI agents for ownership of said internal PCI bus;

a parity generator circuit built into said integrated circuit, said parity generator circuit adapted to respond to parity generation and checking from at least one of said plurality of PCI agents; and a PCI to PCI bridge built into said integrated circuit, said PCI to PCI bridge adapted to interface said internal PCI bus with an external PCI bus such that said plurality of PCI agents can communicate with said external PCI bus.

8. The single die PCI bus system of claim 7, wherein said PCI to PCI bridge is adapted to synchronize signals on said internal PCI bus with said external PCI bus wherein said internal PCI bus and said external PCI bus operate at different frequencies.

9. The single die PCI bus system of claim 7, wherein said PCI to PCI bridge is buffer based bridge adapted to interface said internal PCI bus and said external PCI bus wherein said internal PCI bus and said external PCI bus operate at the same frequency.

10. The single die PCI bus system of claim 7, wherein said internal PCI bus is adapted to substantially comply with a PCI bus specification with respect to interfacing with said plurality of PCI agents.

11. A method of fabricating a fully integrated, single semiconductor die PCI (peripheral component interconnect) bus system, the method comprising the steps of:

a) coupling an internal PCI bus design to a plurality of PCI agent designs;

b) coupling a PCI to PCI bridge design to said internal PCI bus design to create a resulting design;

c) integrating said resulting design into a single integrated circuit on a single semiconductor die; and d) incorporating said integrated circuit into a device.

12. The method of claim 11, wherein step b) further comprises the step of coupling at least one pre-existing design of at least one pre-existing PCI agent to said design of said internal PCI bus such that a large percentage of each of said at least one pre-existing design is reused in a substantially unchanged condition.

* * * * *